United States Patent
Hendricks et al.

(10) Patent No.: US 12,470,075 B2
(45) Date of Patent: Nov. 11, 2025

(54) SELF CONTAINED, REGENERATIVE, DYNAMIC MOTION RESISTANCE MODULE

(71) Applicant: Dynamic Accession LLC, Iselin, NJ (US)

(72) Inventors: Shawn A. Hendricks, Fords, NJ (US); Christopher M. Toner, Germantown, MD (US)

(73) Assignee: Dynamic Accession LLC, Iselin, NJ (US)

( * ) Notice: Subject to any disclaimer, the term of this patent is extended or adjusted under 35 U.S.C. 154(b) by 412 days.

(21) Appl. No.: 18/077,423

(22) Filed: Dec. 8, 2022

(65) Prior Publication Data

US 2024/0195195 A1   Jun. 13, 2024

(51) Int. Cl.
*H02J 7/00* (2006.01)
*A63B 21/072* (2006.01)
*H02N 11/00* (2006.01)

(52) U.S. Cl.
CPC .......... *H02J 7/0042* (2013.01); *A63B 21/072* (2013.01); *H02N 11/002* (2013.01)

(58) Field of Classification Search
CPC ............................ H02J 7/0042; A63B 21/072
USPC ........................................................ 320/107
See application file for complete search history.

(56) References Cited

U.S. PATENT DOCUMENTS

| | | | |
|---|---|---|---|
| 5,645,124 A | 7/1997 | Hartfield et al. | |
| 6,280,361 B1 | 8/2001 | Harvey | |
| 7,537,552 B2 * | 5/2009 | Dalebout | A63B 23/1209 482/121 |
| 9,272,179 B2 * | 3/2016 | Lemos | A63B 21/4043 |
| 9,272,186 B2 * | 3/2016 | Reich | A63B 23/1209 |
| 9,327,160 B2 * | 5/2016 | Tauriainen | A63B 21/0783 |
| 9,586,089 B2 | 3/2017 | Anthony et al. | |
| 9,962,576 B2 | 5/2018 | Anderson | |
| 10,143,880 B1 | 12/2018 | Boatwright | |
| 10,220,235 B2 * | 3/2019 | Norris | A63B 21/153 |
| 10,220,261 B1 | 3/2019 | Garsdean | |
| 10,486,015 B2 | 11/2019 | Orady | |
| 10,589,163 B2 | 3/2020 | Orady | |
| 10,617,903 B2 | 4/2020 | Orady | |
| 10,765,914 B1 | 9/2020 | Trexler | |
| 11,040,231 B2 * | 6/2021 | Rubin | A63B 71/0622 |
| 2003/0213630 A1 | 11/2003 | Pyntikov et al. | |

(Continued)

FOREIGN PATENT DOCUMENTS

CA       298911 A1    3/2021
WO   1991011221 A1    8/1991

(Continued)

OTHER PUBLICATIONS

PCT Search Report, Jul. 16, 2021, pp. 1-15, International Bureau of WIPO.

(Continued)

*Primary Examiner* — Jack Chiang
*Assistant Examiner* — Suchin Parihar
(74) *Attorney, Agent, or Firm* — Danielle C. Sullivan; Carter Ledyard & Milburn LLP

(57) ABSTRACT

The present invention provides a system and method providing a self-contained, regenerative main power source located within a stator section of an electromechanical motor converting physical energy into electrical energy and applying it to the power source to recharge the power source.

12 Claims, 12 Drawing Sheets

(56) References Cited

U.S. PATENT DOCUMENTS

| | | |
|---|---|---|
| 2005/0107719 A1 | 5/2005 | Abbound |
| 2006/0136173 A1 | 6/2006 | Case et al. |
| 2007/0155587 A1 | 7/2007 | Huang |
| 2008/0119763 A1 | 5/2008 | Weiner |
| 2008/0262392 A1 | 10/2008 | Ananny et al. |
| 2009/0269728 A1 | 10/2009 | Verstegen et al. |
| 2010/0234184 A1 | 9/2010 | Le Page et al. |
| 2011/0144841 A1* | 6/2011 | Ruben .................... H02K 11/22 74/411 |
| 2013/0065680 A1 | 3/2013 | Zavdsky et al. |
| 2014/0038777 A1 | 2/2014 | Bird |
| 2014/0135593 A1 | 5/2014 | Jayalth et al. |
| 2014/0194250 A1 | 7/2014 | Reich |
| 2014/0228175 A1* | 8/2014 | Lemos ............... A63B 21/0783 482/93 |
| 2014/0287876 A1 | 9/2014 | Fitter et al. |
| 2015/0120016 A1 | 4/2015 | Houfmanfar et al. |
| 2015/0287768 A1 | 10/2015 | Luna et al. |
| 2015/0309563 A1 | 10/2015 | Connor et al. |
| 2015/0366504 A1 | 12/2015 | Connor et al. |
| 2018/0001181 A1 | 1/2018 | Von Prellwitz et al. |
| 2018/0100751 A1 | 4/2018 | Toner |
| 2018/0214729 A1* | 8/2018 | Rubin ................ A63B 24/0087 |
| 2018/0361189 A1 | 12/2018 | Gupta |
| 2019/0151716 A1 | 5/2019 | Bird |
| 2019/0344123 A1* | 11/2019 | Rubin ................ A63B 24/0062 |
| 2019/0389535 A1 | 12/2019 | Moening et al. |
| 2020/0047027 A1 | 2/2020 | Ward |
| 2020/0047031 A1 | 2/2020 | Orady |
| 2020/0070032 A1 | 3/2020 | Orady |
| 2020/0151595 A1 | 5/2020 | Jayatlh et al. |
| 2020/0164246 A1 | 5/2020 | Snover |
| 2020/0289890 A1 | 9/2020 | Kim et al. |
| 2021/0008402 A1 | 1/2021 | Orady |
| 2021/0038937 A1 | 2/2021 | Orady |
| 2021/0038938 A1 | 2/2021 | Orady |

FOREIGN PATENT DOCUMENTS

| | | |
|---|---|---|
| WO | 2017106781 A1 | 6/2017 |
| WO | 2019070436 A1 | 4/2019 |

OTHER PUBLICATIONS

PCT Search Report, Mar. 20, 2023 pp. 1-11—International Bureau of WIPO.

* cited by examiner

SELF CONTAINED, REGENERATIVE, DYNAMIC MOTION RESISTANCE MODULE

This application is a Continuation in Part of U.S. patent application Ser. No. 17/485,691, filed Sep. 27, 2021, entitled "DYNAMIC MOTION RESISTANCE MODULE, which is a Continuation of U.S. patent application Ser. No. 17/236,327, filed Apr. 21, 2021, entitled "DYNAMIC MOTION RESISTANCE MODULE," which claims priority to U.S. Provisional Patent Application No. 63/014,191 filed Apr. 23, 2020, entitled "DYNAMIC RESISTANCE EXERCISE MODULE," and are hereby incorporated by reference herein.

FIELD OF THE INVENTION

Embodiments described herein generally relate to the power supply used in an electromechanical stator or rotor motor, such as a modular dynamic force module used to vary unique dynamic forces during different forms of physical activity.

BACKGROUND OF THE INVENTION

Dynamic and varying forces used during physical activity maximize efficiency and reduce the potential for injury or strain versus static weights or dedicated electromechanical exercise systems.

Some exercise machines utilize resistance mechanisms, such as U.S. Pat. No. 6,440,044. However, U.S. Pat. No. 6,440,044 is limited in the amount of resistance it can provide for a user. Further, the resistance mechanism is based on counterweights rather than by force created by the user. This makes the user more prone to overworking their muscles and makes the user more susceptible to injury.

U.S. Patent Publication No. 20030027696, teaches a cable machine having weight stacks attached to a cable. A pulley system is utilized which is limited in the range of motion that can be used and can cause a user to overly isolate a single muscle which could result in injury.

Resistance bands, such as U.S. Design Patent No. 750,716, can be attached to different equipment to provide a variety of forces in varying ranges of motion, however, the resistance is limited based on the quality of the band. Furthermore, the resistance created using the bands is static throughout physical activity.

U.S. Patent Publication No. 20080119763 teaches a system for acquiring, processing and reporting personal exercise data on selected muscle groups by measuring vector force from at least one muscle or muscle group acting on physical exercise equipment. It provides the user with information so that the user can make manual adjustments to the exercise equipment.

U.S. Patent Publication No. 20200151595 discloses processing sensor data to improve training for the user. The invention provides the user with feedback and recommendations to make form and manual resistance adjustments for subsequent modifications of training regimens.

U.S. Pat. No. 10,661,112, discloses digital strength training using information received related to the position of an actuator coupled to a cable which is coupled to a motor.

The prior art fails to provide a modular dynamic motion resistance module that analyzes real time data to provide automatic real time adjustments to forces. The present invention improves the efficiency of physical activity, such as exercise, is more accurate and reduces injury and strain to the user. The prior art also fails to provide a modular power system: The present invention provides a rechargeable, self-contained main power supply within a stator section of a motor or similar exercise module. The prior art discloses electromechanical stator and rotor motors relying on external power supplies, replaceable battery packs and motor control electronics. The present invention improves the prior art by providing a unique modular packaging system and method. The power supply harnesses the work of the user, putting the energy back into the renewable power supply of the device.

SUMMARY OF THE INVENTION

The present invention provides a system and method for improving the efficiency of physical activity while harnessing the user's expended energy to regeneratively charge the same device. The power supply is packaged within a stator of an electromechanical motor. An embodiment is shown used in a DMRM to vary the forces during different forms of physical activity and returning a portion of the mechanical work to recharge the inner renewable power pack of the motor. This arrangement of a regenerative power supply within a stator of an electromechanical motor has applications to other portable, e-vehicle hub motor and regenerative mechanical or physical work use cases.

The present invention provides a self-contained, regenerative main power source located within a stator section of an electromechanical motor converting physical energy into electrical energy and applying it to the power source to recharge the power source. The present invention also provides a method for recharging a self-contained power source within a stator in an electromechanical motor, the method including packaging the self-contained power source within an inner section of the stator, a user creating a primary extension or contraction force, gathering and processing power consumption and directional force sensor data of the electromechanical motor using sensor measurement and tracking algorithms, based upon the primary contraction force or the primary extension force during physical activity, and reversing a current flow using a motor controller, wherein the current flows back to the self-contained power source proportionately to an adaptive force experienced by the user.

The Dynamic Motion Resistance Module ("DMRM") and method of creating varying forces is an improvement to the prior art because it uses variable torque force (e.g., DC motors, Eddie currents, friction clutch, flywheel or torsional sensors feedback) that is converted to a linear force and controlled by a microprocessor, receiving adjustments based upon a variety of sensors and calculated optimized forces. This allows a user to perform physical activity, such as exercise, based on his or her unique ability creating the varying force based on the amount of force the user is able to apply. The force may vary within a single repetition or a set of exercise if the user's applied force capacity fluctuates within the activity. The DMRM is particularly helpful for users recovering from injuries and conscious of not overworking muscles.

Exemplary embodiments disclosed herein describe a module that provides for a dynamic force control, that is electromechanically controlled in a closed loop apparatus (Mechanical, Electrical, Software) that can vary the relative forces a user experiences and adapts to the individual during physical activity, such as a workout or therapy session, based on a variety of input variables. The input variables include repetition rate, recovery period, current physical activity profile, daily goals, historical guidance, and AI adjustments.

The input variables may be received from an associated mobile application on a user's device, or from the force module. The DMRM is unique from other physical activity equipment, such as static Olympic weight plates, because it is a modular system that uses variable torque force to create dynamic forces for the user in real-time. Thus, the DMRM may be used as a replacement module to static weight plates.

The DMRM improves a user's physical activity through adaptation and adjustment of forces, based upon inputs from a variety of one or more sensors and calculated adjustments to optimize each physical activity and force efficiency. The sensors may include Hall Effect (and/or accelerometer, gyro meter, magnetometers, proximity, optical) for position, Strain Gauge (for example, Force Sensitive Resistor, Piezo, optic, or torsional sensor) for forces, contact closures or proximity detection for safety interlocks or motor control.

The DMRM can be attached to many Olympic or standard Barbell and Dumbbell components or other exercise equipment to add dynamic forces to an otherwise static mass.

The DMRM may be mounted in unique ways. It may be profiled and used for static force routines with programmable forces and hold times, adapted to the daily physical activity or to add the same elements of closed loop force adjustments to other physical exertion applications and therapies.

The present invention provides a modular and dynamic force apparatus for adjusting standard and dynamic torque-to-linear forces during physical activity in real-time, the apparatus including a force module, a user device and an apparatus tracking processing unit. The force module includes an open hub attachment point, wherein the open hub attaches the apparatus to an external source, one or more sensors measuring data for physical activity efficiency, an internal processor, wireless radio and force sensor module, a variable length cable, a force generating component, and motor controls. The internal processor, wireless radio and force sensor module includes an apparatus tracking measurement unit ("ATMU") adapted to measure data, a first electronic communications channel for transmitting the measured data to an apparatus tracking processing unit ("ATPU"), and a second electronic communications channel for transmitting one or more apparatus conditions data to adjust dynamic forces. The user device receives one or more apparatus conditions data over the second electronic communications channel for real-time notification and/or adjustments to the user. The user interface can include a display that provides user feedback and an apparatus tracking processing unit ("ATPU"). The ATPU includes the first electronic communications channel for receiving the measured data from the ATMU and motor controller, a microprocessor, a memory storage area, a database stored in the memory storage area, and a tracking processing module located within the memory storage area. The database stores a first set of evaluation rules and a second set of evaluation rules, the first set of evaluation rules corresponding to one or more tracking parameters, and the second set of evaluation rules corresponding to the one or more apparatus conditions. The tracking processing includes program instructions and algorithms that, when executed by the microprocessor, causes the microprocessor to determine the one or more tracking parameters using the measured data and the first set of evaluation rules, and determine the one or more apparatus conditions data using the one or more tracking parameters and the second set of evaluation rules.

The present invention also provides an improvement to the prior art by providing a unique modular packaging system and method for optimizing the overall space requirements of a typical force generating device, while converting physical activity to regeneration of the devices renewable power pack.

The present invention also provides a method of incorporating a rechargeable power source, such as batteries renewable power packs or fuel cells. The rechargeable power source may be located within a stator section of a force generating motor, such as the DMRM or e-bike/vehicle hub motor.

The present invention provides a self-contained regenerative power supply within a DMRM, or other device, that is a significant improvement to exercise equipment including portable equipment compared to prior art disclosures. The present invention enables new modes of exercise by maximizing the dynamic feedback and adjustments to the experienced forces and providing user feedback, while the human power directly charges the power supply of the device (for example, batteries or fuel cells). The self-contained regenerative power supply extends the operation of the device, as opposed to requiring an external re-charge. The regenerative feedback produced may also provide psychological motivation during the exercise activity, as the work energy of the physical exercise performed by the user is converted back from the same motor used to simulate a resistive force.

The present invention provides a self-contained, regenerative main power source located within a stator section of an electromechanical motor, where the energy is applied to the power source to recharge the power source.

The present invention also provides a method for recharging a self-contained power source within a stator in an electromechanical motor, the method including packaging the self-contained power source within an inner section of the stator, a user creating a primary extension or contraction force, gathering and processing power consumption and directional force sensor data of the electromechanical motor based upon the primary contraction force or the primary extension force during the physical activity, and reversing a current flow using a motor controller, wherein the current flows back to the self-contained power source proportionately to an adaptive force experienced by the user.

BRIEF DESCRIPTION OF THE DRAWINGS

The various advantages of the embodiments of the present disclosure will become apparent to one skilled in the art by reading the following specification and appended claims, and by referencing the following drawings, in which:

DETAILED DESCRIPTION

The DMRM's unique modular functionality allows it to attach to or mount to various traditionally used force equipment (e.g., barbells, racks, benches) as well as use in other physical activities. The DMRM includes a full closed/feedback loop motor control of adjustment and refinements based upon the user's dynamic or profiled reaction to the force being performed, in real-time. This allows the user to utilize numerous muscle groups at once in an almost limitless number of physical activity forces and ranges of motion. The varying forces are based on applied user force and limits the likelihood of injury. Furthermore, the present invention has less mass than the traditional static weight plate equivalent, therefore, accidentally dropping the apparatus on a toe or finger, would likely cause less injury to the user. The DMRM is accessible to users of various strength levels and can be easily transported. The modularity, combined with the novel means of replicating varying forces, and the lighter mass make the DMRM unlike any other force equipment.

The DMRM may be used for a variety of types of physical activity. This includes exercise, boundary constraints, safety modules and two-person interactive activities.

Figure 1:
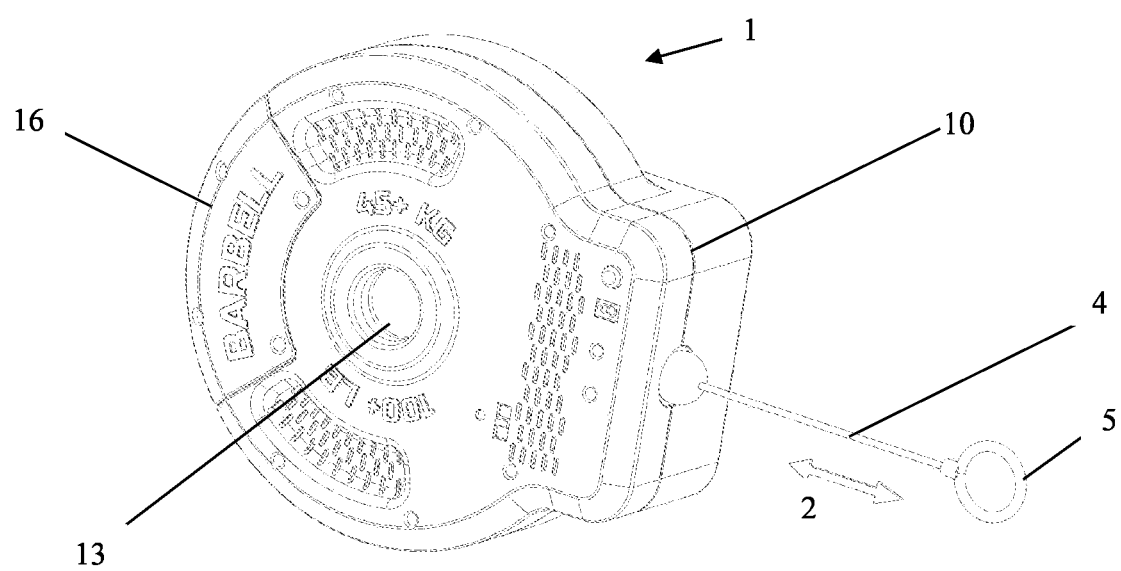
FIG. 1 shows an exemplary DMRM configured to operate according to an embodiment of the invention for use with force equipment commonly found at professional workout studios or home gyms.

FIG. 1 shows an example of a modular, standalone Dynamic Motion Resistance Module 1. Although some of the exemplary embodiments described herein are tailored to a stand-alone module, the present disclosed apparatus and methods are not limited to this configuration and can be used in other apparatus environments using similar applications and methods. One or more modules may be mounted or anchored to the equipment being used in varying configurations and mounting positions.

As illustrated in FIG. 1, the apparatus includes an open hub 13, that is sized to fit on varying types of equipment, such as Olympic or standard Barbell and Dumbbell components. The outer shell 10 houses the dynamic force components including a motor, such as a DC motor, a power source, a smart controller/wireless communication, sensors, an embedded processor and a cable or strap spool 4. The module may also include a display. Cable or strap spool 4 of the DMRM 1 provides a connection point 5 to attach hand grips, bars or fixed points for the user to use the attached module. Sensors may include torsional sensors such as Hall effect, strain gauge, safety interlocks as well as external physiological sensors such as heart rate, forces, timing, workout form, calorie burn, workout repetition speed and workout history. The sensors are located within the force module; however the exact location may vary. The sensors may be located together with the internal processor and wireless radio module or separately within the force module. The sensor feedback may be audible, tactile and/or haptic. DMRM 1 is fitted onto internal rotational part 13 providing varying forces to the strap or cable 4 in a linear direction 2, such that the user experiences a varying force based upon sensor control and calculated inputs to optimize the physical activity session. DMRM 1 also accommodates placard and branding space 16.

Figure 2:
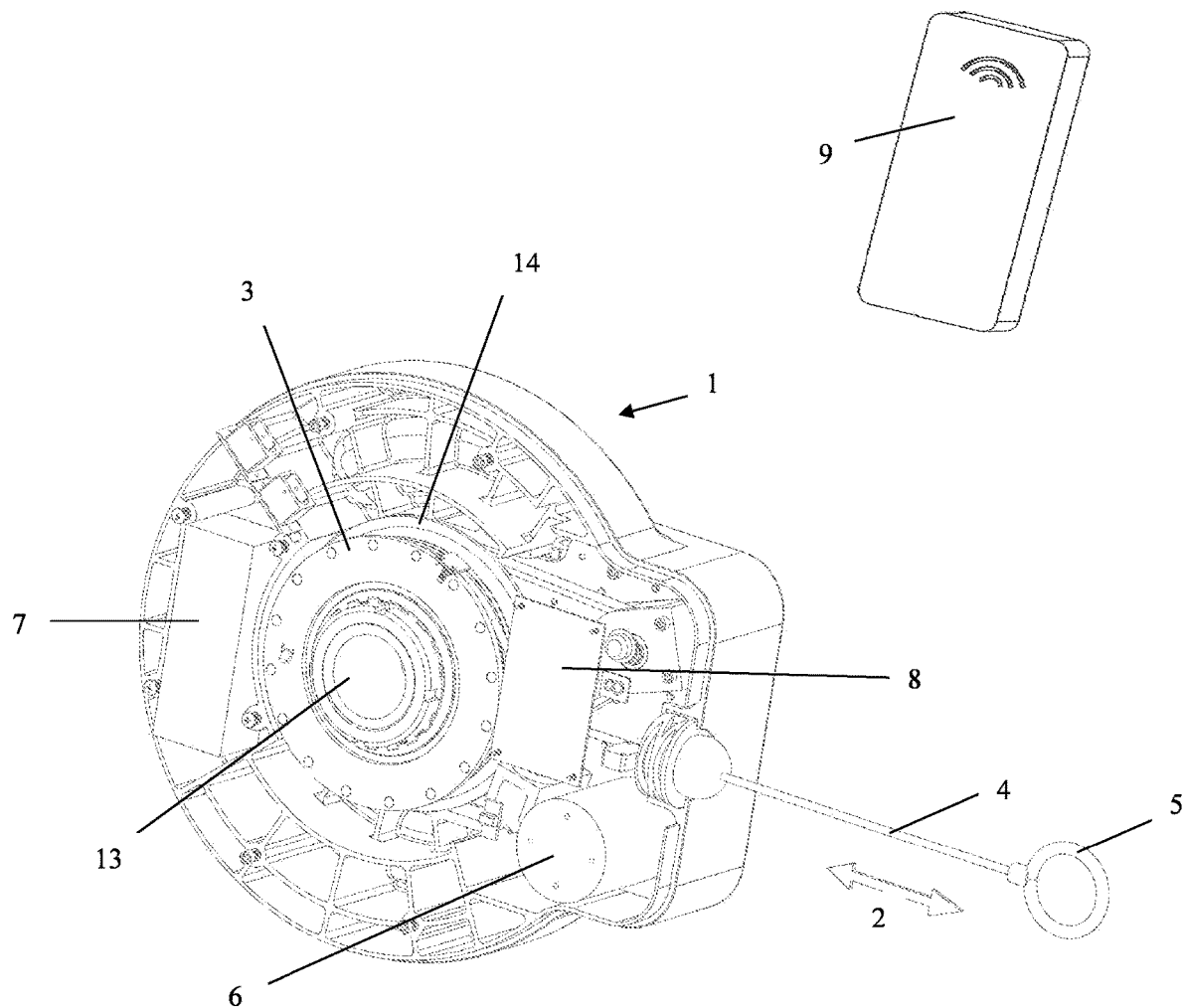
FIG. 2 shows an exemplary internal view of the DMRM.

FIG. 2 shows an exemplary illustration of the inside of DMRM 1 and internal force functionality demonstrating the major components applied in delivering the dynamic forces including the resulting linear vector of force 2, created by the internal rotational 3 force and a typical communication device 9 sending the commands for varying forces to the module. The torque-to-linear force is generated by the motor, gearing, pulleys or Eddy force component 6, powered by a supply source 7, for example, batteries, fuel cells or line power. The forces and communication are handled by an internal processor, wireless radio, force sensor and positional module 8 acting both as an apparatus tracking measurement unit ("ATMU") and a self-contained integrated DMRM (offline/manual mode) alternately receiving control commands from a commercially available external device 9, acting as an apparatus tracking processing unit ("ATPU"). The ATMU measures apparatus/module data and uses an electronic communications channel to transmit the measured data to the ATPU. A second electronic communications channel is used by the ATMU to transmit one or more of the apparatus conditions data to the user interface to adjust dynamic forces. The user interface, either local on the device or an associated application, is used to adjust all forces and physical activity profiles. The ATPU includes a microprocessor and a memory storage area. The memory storage area includes a database and a tracking processor module. The tracking processing module includes program instructions that, when executed by the microprocessor, determines one or more tracking parameters using the measured data and a set of evaluation rules and the apparatus and/or module conditions measured by the ATMU, using one or more of the tracking parameters and another set of evaluation rules. The database stores the sets of evaluation rules. At least one set of rules corresponding to one or more of the personal tracking parameters, such as repetitions per minute, total repetitions, calories burned, and goals achieved, another set of evaluation rules corresponding to the one or more conditions of the apparatus and/or module.

The embedded processor of module 1 monitors the electronic motor control loop, sensor management and wireless communications, such as Bluetooth Low Energy (BLE), Wi-Fi or cell. The embedded processor provides local control and calculations and variables, such as main power, timers, motor control profile, start/stop, effective forces and safety interlock status. It can also provide the ATPU with calculated or raw data so higher-level calculations can be performed at either boundary of the architecture. The ATPU is a logical element that may be physically located within the DMRM or in the user interface. The ATPU transmits the apparatus conditions such as battery charge status, safety status and system health. The optimized linear forces are directed to cable or strap 4. Cable or strap 4 includes an attachment point 5, such as a cleat, an eyehook or other common or custom attachment points, to allow a variety of accessories and attachment options to cable or strap 4. When the module is "off-line" it can be in either low power sleep mode or powered off.

Figure 3A:
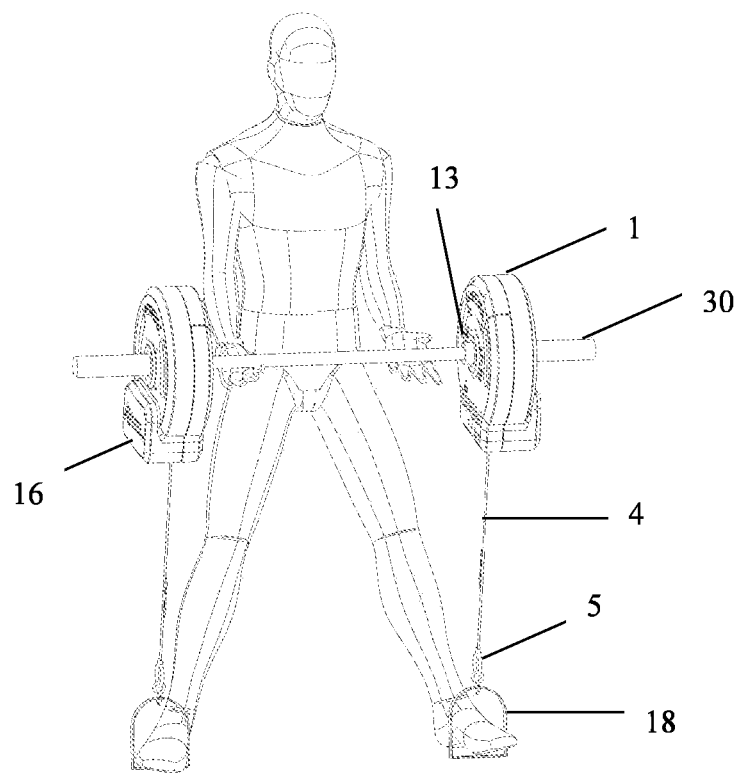
FIGS. 3a and 3b show an exemplary use with the DMRM.
Figure 3B:
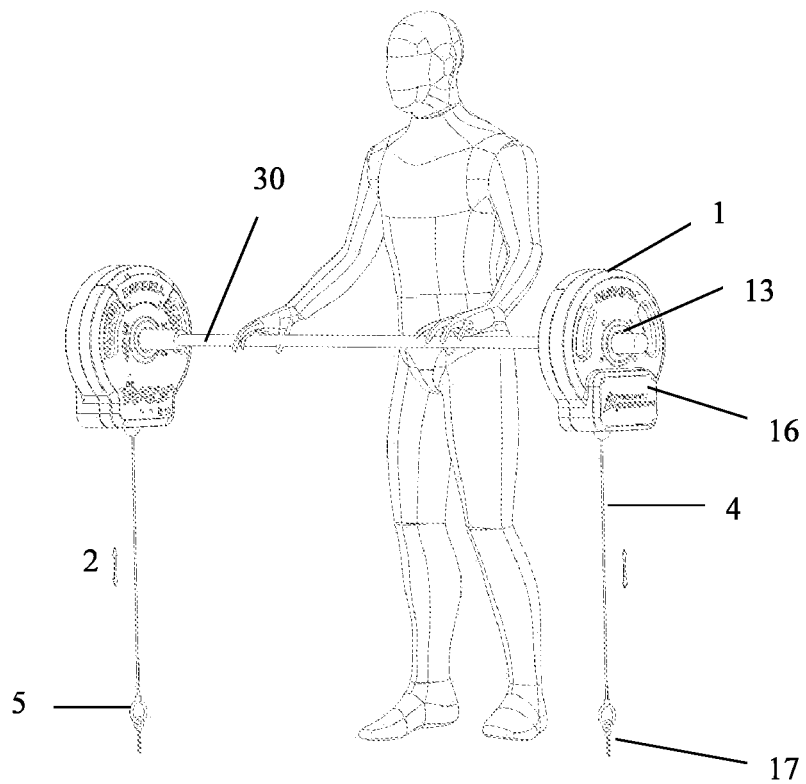

FIGS. 3a and 3b illustrate an embodiment of the DMRM 1 in practice with application of forces and internal force functionality mounted on a typical exercise barbell or dumbbell rod 30. The resulting vector of force 2 may be accommodated by an internal Industry Standard/Common Barbell or Dumbbell rod 30 or other common hub adaptations for the module to connect/mount. Strap or cable 4 and attachment point 5 are in a linear direction, such that the user experiences a varying force based upon rate, form, pre-planned exercise routines, sensor and/or calculated inputs to optimize a physical activity session. DMRM 1 includes multiple safety mechanisms, such as cable safety stops (cut-off switch), anchor points (foot anchor 18 in FIG. 3a or floor anchor 17 in FIG. 3b), and/or hardware/software control loops and feedback loops (Sensor, Electronic, Software) for a real-time closed loop controlled and dynamic force application. Foot anchors 18 counteract the applied forces for a dynamic free weight experience.

Figure 4A:
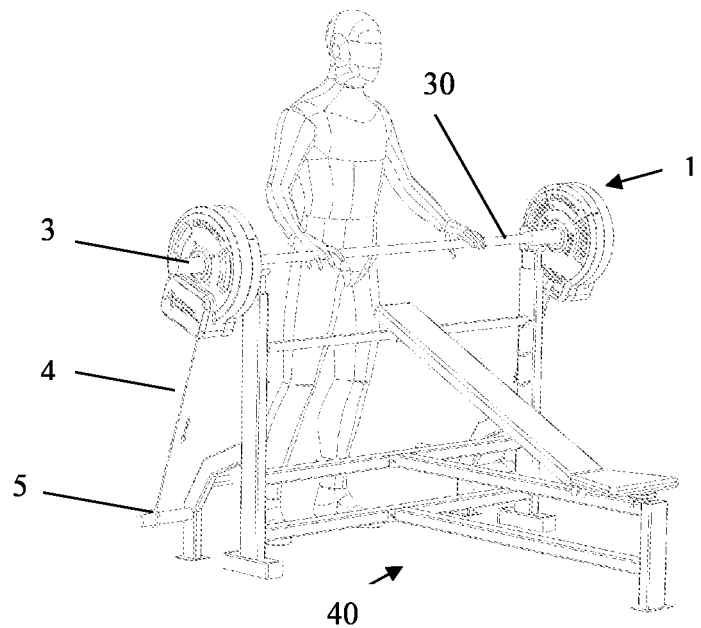
FIGS. 4a, 4b and 4c show an exemplary use of the DMRM with an exercise bench.
Figure 4B:
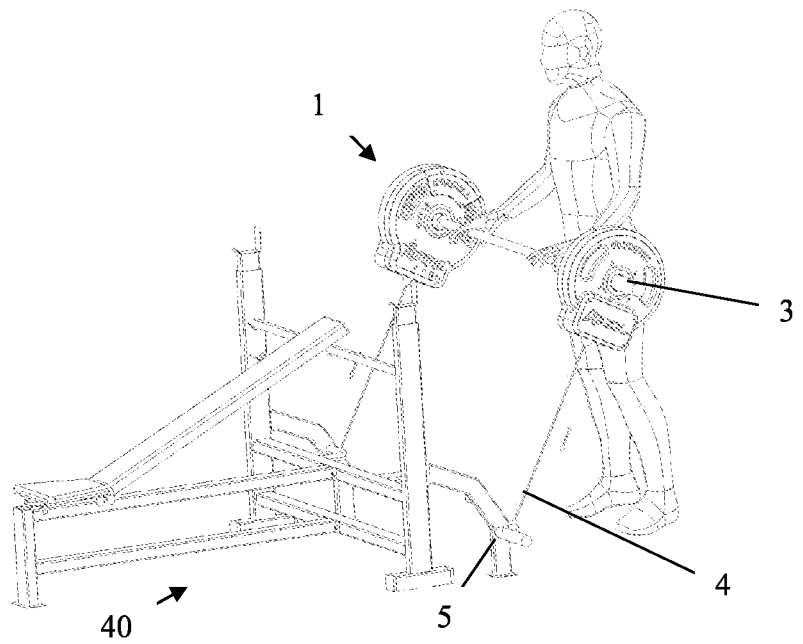
Figure 4C:
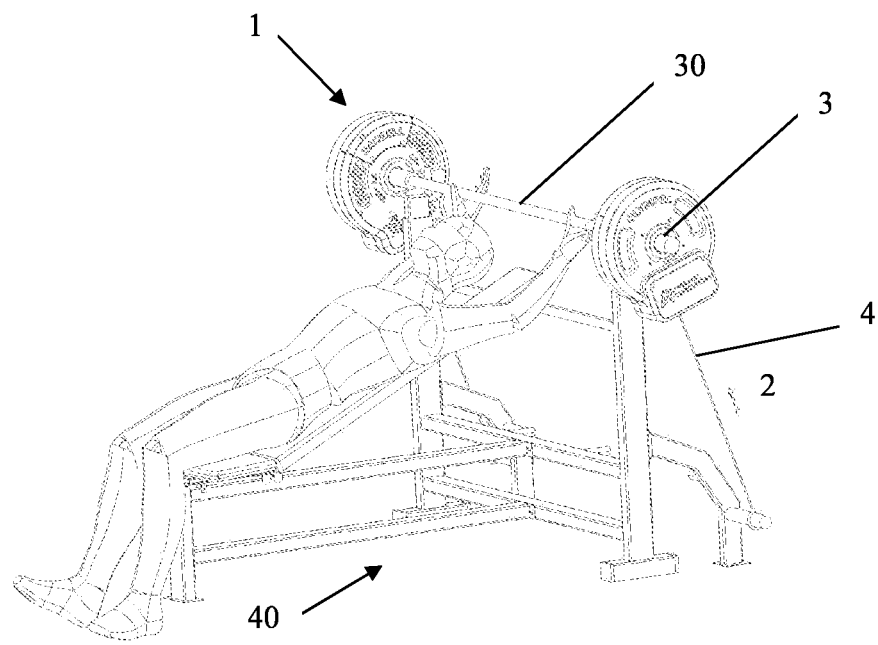
Figure 5:
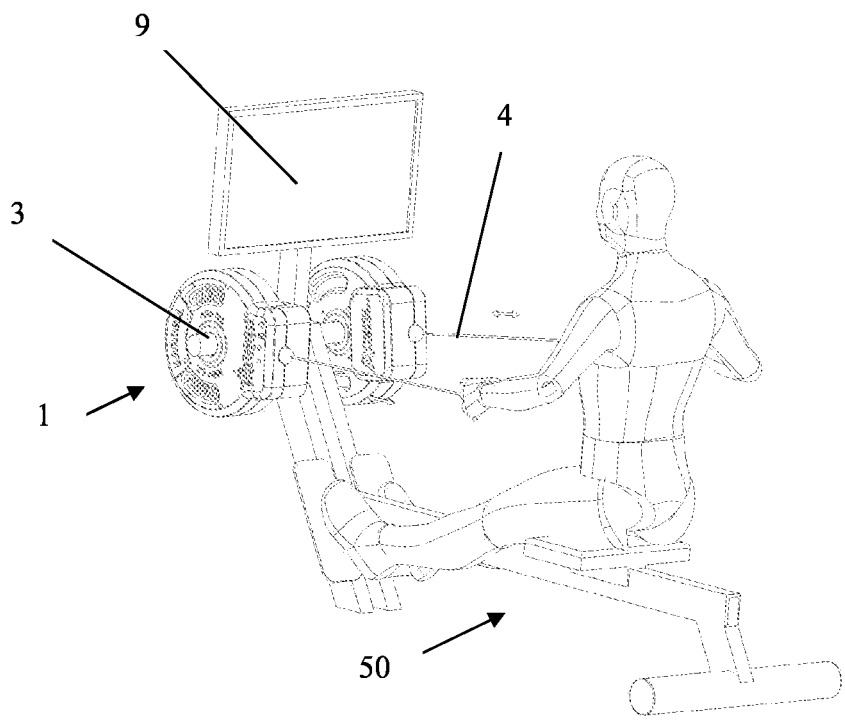
FIG. 5 shows an alternate use of the DMRM with the user pulling the variable force cable on a rowing machine.

FIGS. 4a, 4b, and 4c illustrate DMRM 1 being used with weight bench 40. DMRM 1 is mounted on bar 30. The user is able to perform a variation of exercises with different ranges of vector of force 2. FIG. 5 illustrates the use of DMRM 1 on rowing machine 50. The user interface 9 can be part of the rowing machine or can be a separate user interface such as a smartphone. Two DMRM 1 are attached to rower 50, however the number of modules attached to the equipment can be one or more. The user pulls on cables 4 while rowing on rowing machine 50 and receives real-time feedback and a haptic sensation of actually rowing in water.

Figure 6:
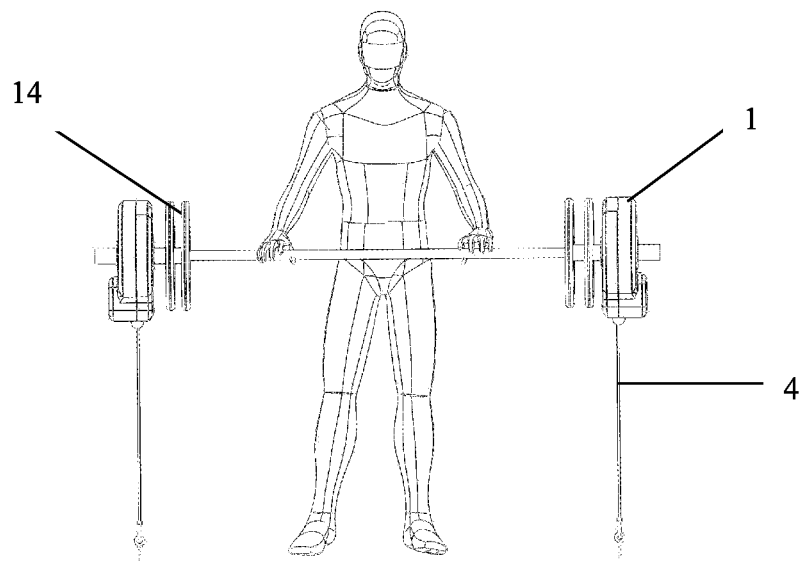
FIG. 6 shows an alternate use of the DMRM with the user pulling the variable force cable.
Figure 7:
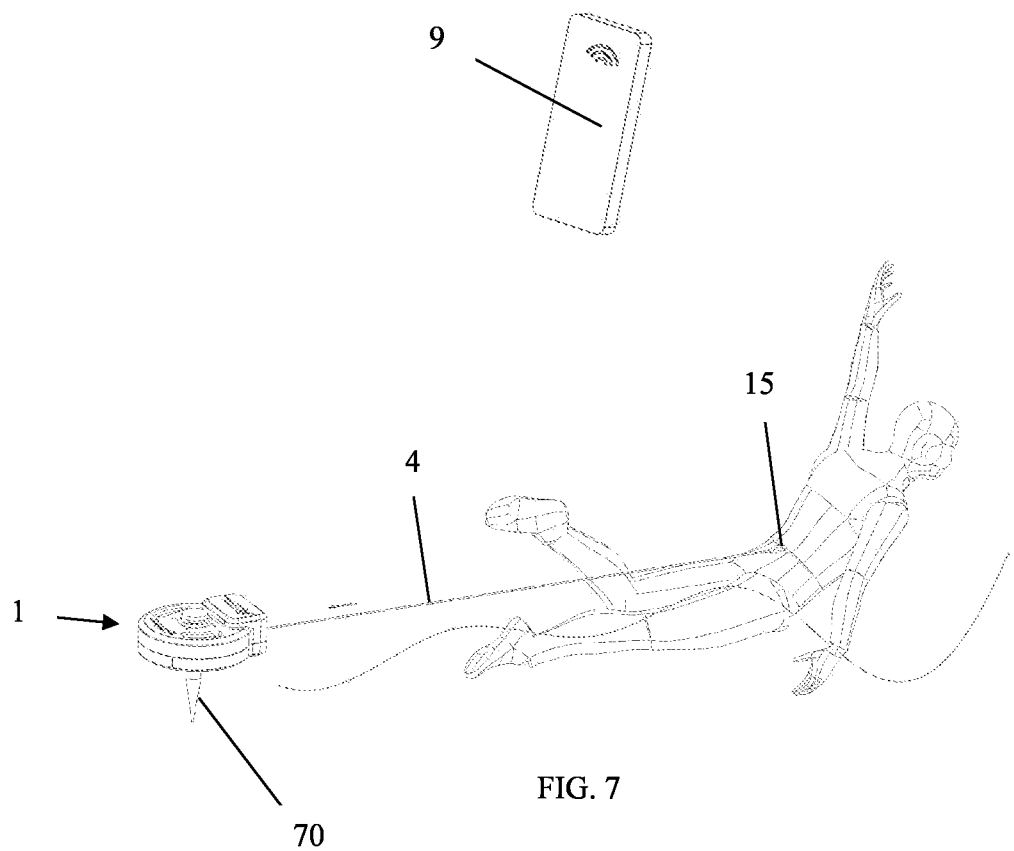
FIG. 7 shows an alternate use of the DMRM with the user pulling the variable force cable while swimming.
Figure 8:
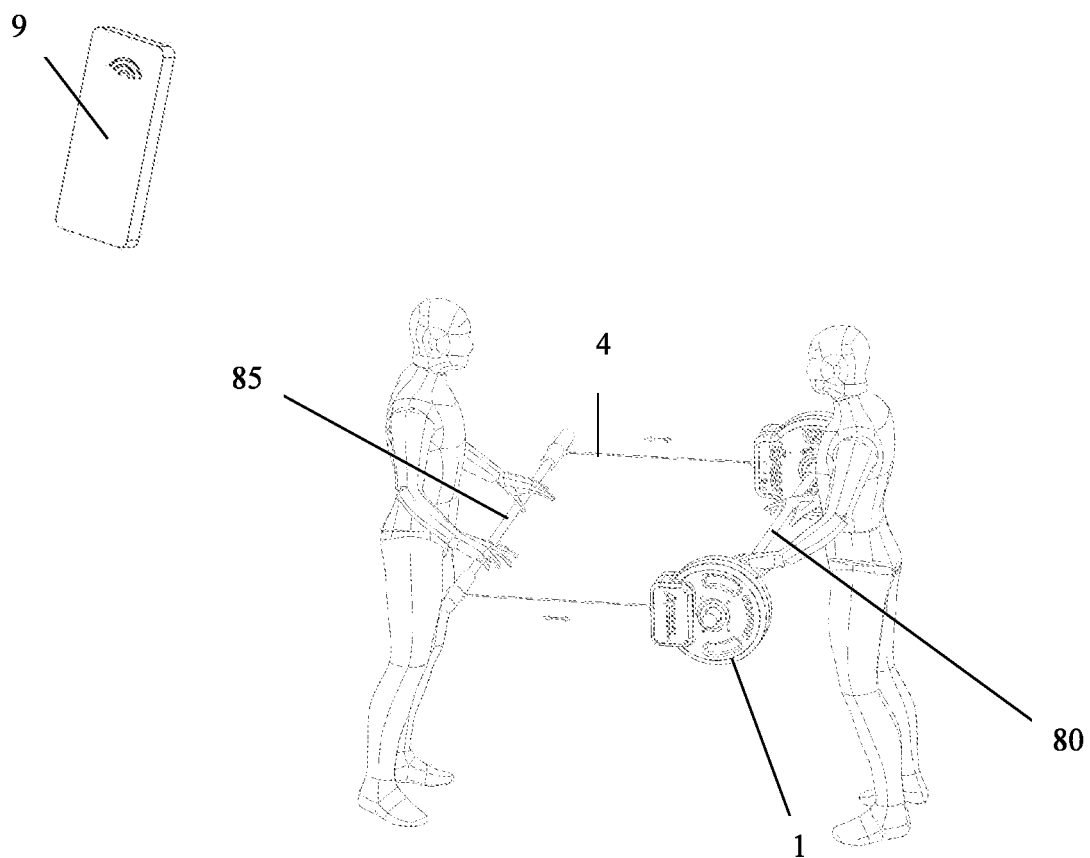
FIG. 8 shows an alternate use of the DMRM with two interactive users.
Figure 9:
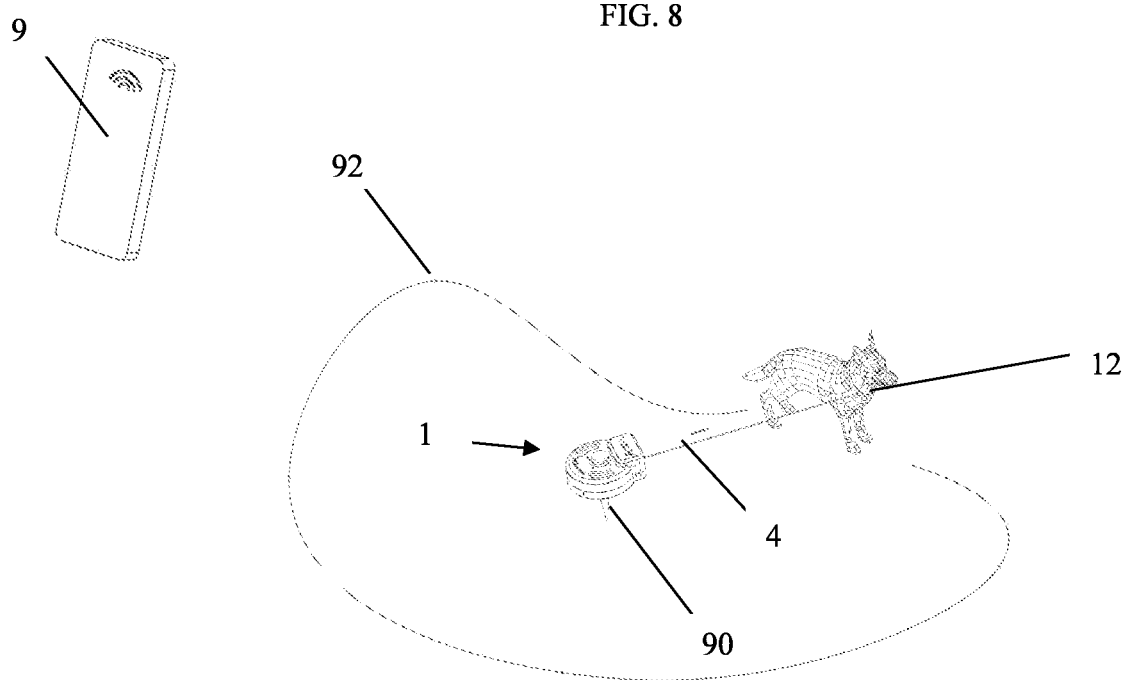
FIG. 9 shows an alternate use of the DMRM with a pet.

FIGS. 6, 7, 8 and 9 show exemplary illustrations of additional uses with DMRM 1. In addition to mounting the DMRM to traditional exercise equipment, static weight plates 14 may be added as seen in FIG. 6. DMRM 1 may be mounted in other ways, for example, DMRM 1 may be mounted to one or more anchor points 70 on a load bearing structure and then attached to a swimmer's harness 15 to adjust or measure dynamic physical activity force while swimming (FIG. 7). As seen in FIG. 8, DMRM 1 may also be used for two-person interactive exercises or therapy activities. One user holds the onto barbell 80 where two modules are mounted, for example, while the other user attaches a barbell (or other form of equipment) 85 to strap or cable 4 via attachment point 5. Another example, shown in FIG. 9, attaches DMRM 1 to an animal or pet by a harness or leash 12, for example. DMRM 1 provides freedom of movement for the animal, unless the animal reaches the user set boundary. Once the set boundary 92 is reached; dynamically applied forces begin to apply resistance leading to a full stop (a hold or lock mode, for example) at a controlled length and containment.

Figure 10:
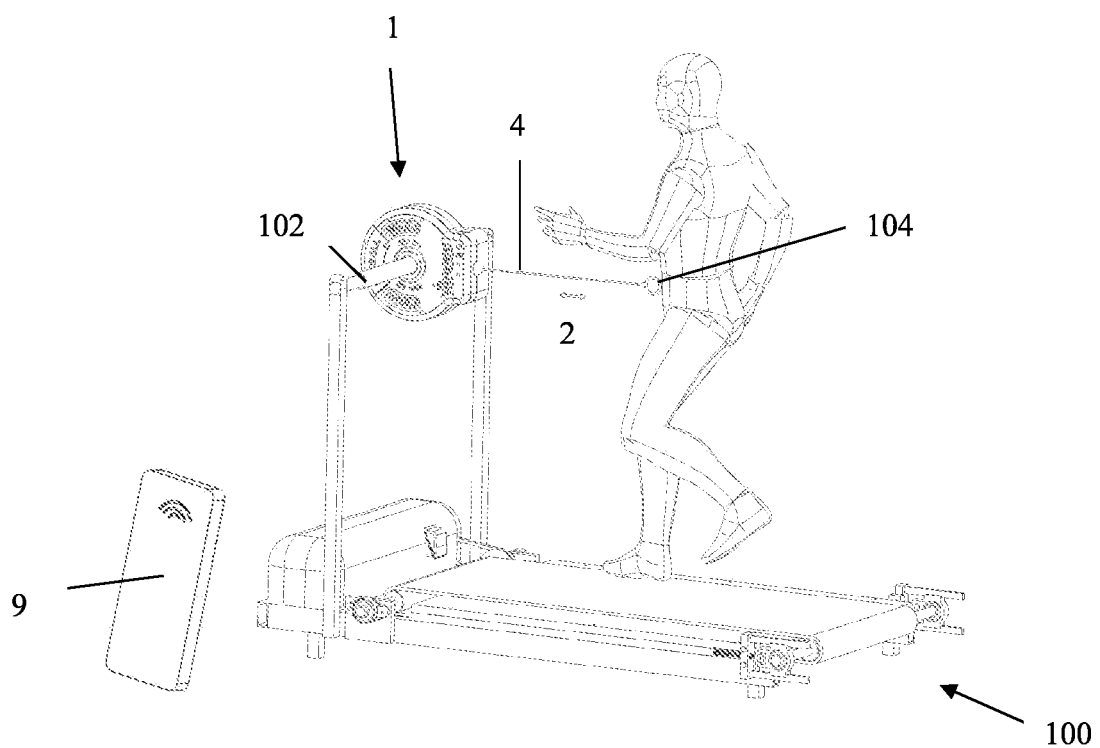
FIG. 10 shows an alternate use of the DMRM on a treadmill.
Figure 11:
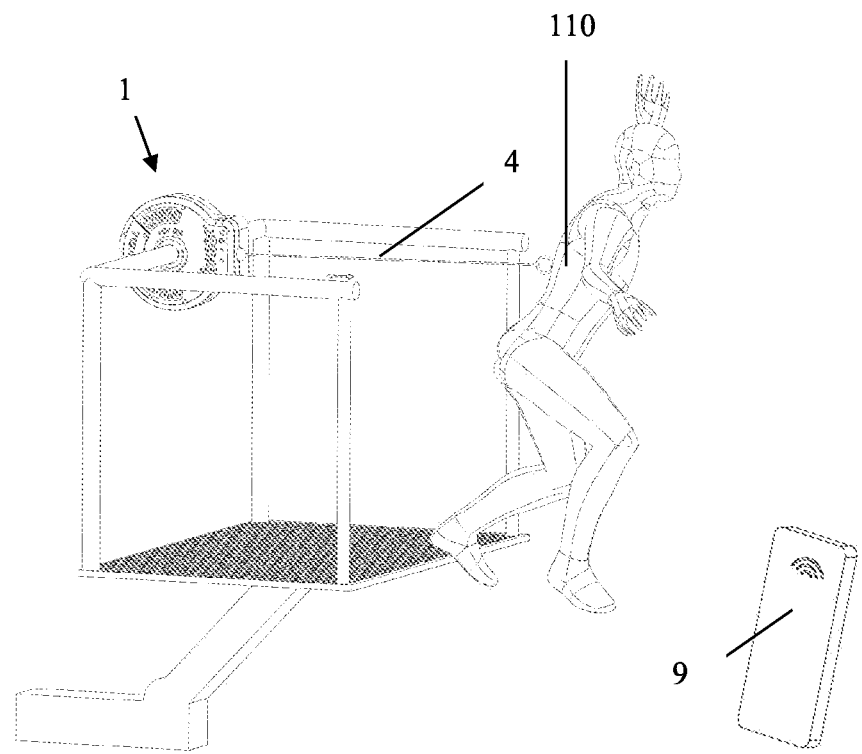
FIG. 11 shows an alternate use of the DMRM as a safety module.
Figure 12:
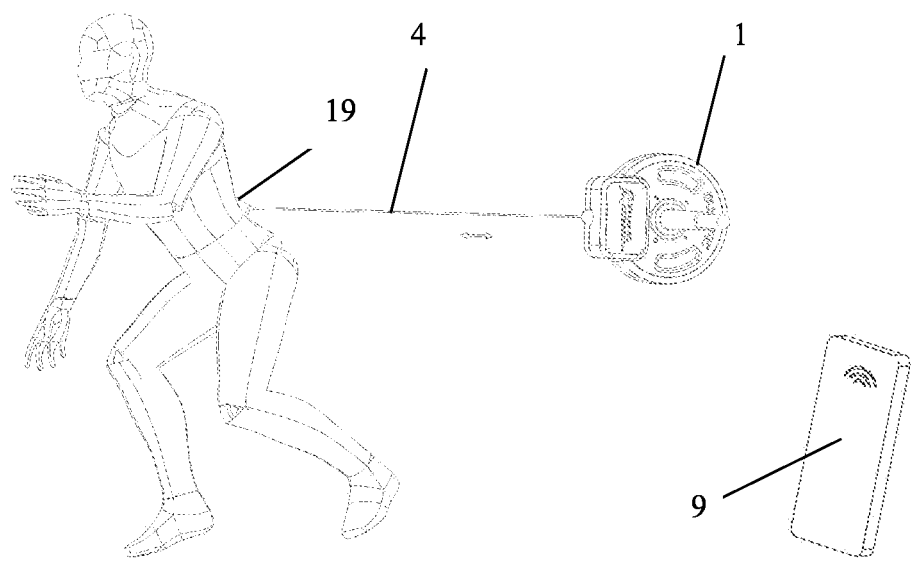
FIG. 12 shows an alternate use of the DMRM with the user pulling the variable force cable.

FIGS. 10, 11 and 12 provide additional alternate uses of DMRM 1. FIG. 10 shows attaching DMRM 1 to treadmill 100 at attachment point 102 and attaching cable or strap 4 to the user's waist by a harness or other connection point 104 keeping the runner perfectly centered on treadmill 100. DMRM 1 may also be used as a safety arresting module, such as in FIG. 11, attached to a user at connection point 110, such as a harness, providing freedom of movement to the user (human or animal). If, or when, a spurious force is detected, such as a fall or trip, the apparatus holds or locks, securing the user. FIG. 12 illustrates use by a sprinter or skater in which DMRM 1 is attached to the user by a harness or other connection point 19 during training. The apparatus senses and controls the applied forces to the user. The module can additionally be profiled and used for static force routines with programmable forces and hold times, adapted to the daily physical activity or to add the same elements of closed loop force adjustments to other physical exertion applications and therapies.

Figure 13:
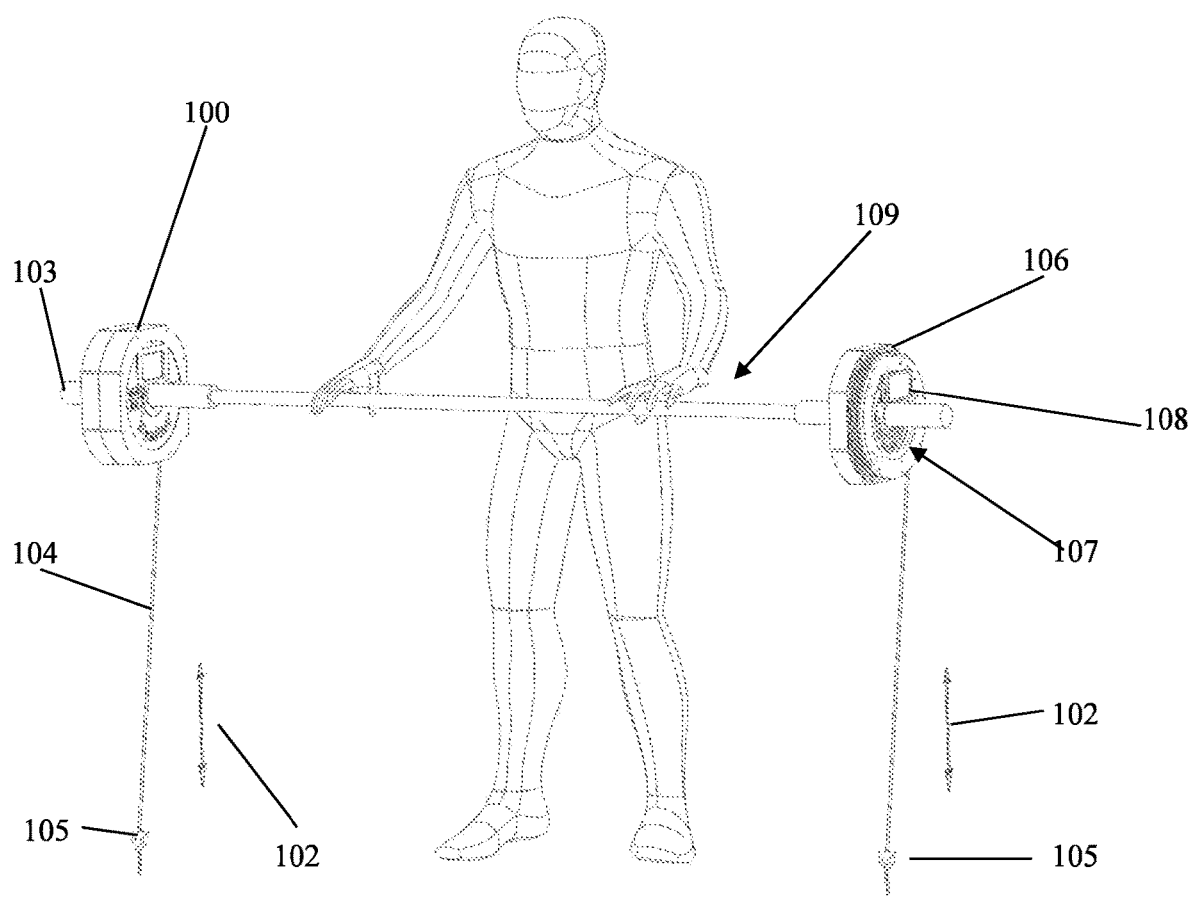
FIG. 13 shows an exemplary embodiment of a user and a DMRM configured on a mounted standard barbell with the DMRM casework cover removed.
Figure 14:
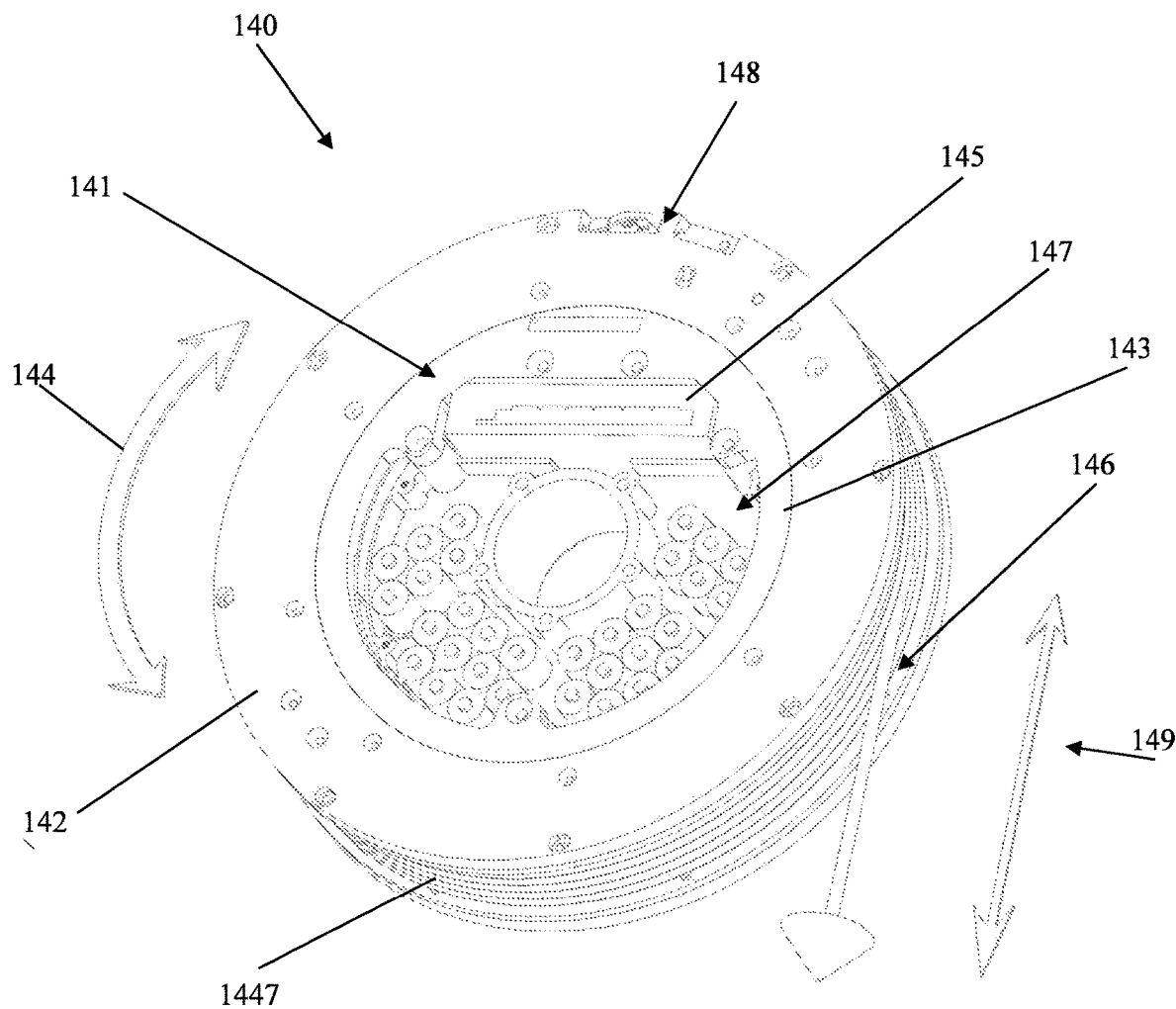
FIG. 14 shows an exemplary embodiment of an isometric view of the inner workings of a DMRM with the self-contained regenerative power supply packaged within the DMRM.

FIG. 13 further illustrates DMRM 100 with self-contained regenerative power source/supply 107 packaged within DMRM 100. The casework covers are removed 106, as shown on the user's left-hand side, exposing the motor controller and local user display 108 (ATPU or other interface electronics) and the self-contained regenerative power supply 107 packaged within the stator of the electromechanical motor or similar force generating devices. The device's cable or strap 104 is anchored at an anchor point 105, for example. When a mode is selected and exercise has started, the user experiences resulting force 102, which is optimized during the routine based either upon the speed at which the user is moving the device, or in the case of pre-calculated routines, dynamic adjustments are calculated during the exercise and applied to the original plan. These adjustments are modified in real-time based upon speed and/or repetition rate, all while maintaining the form and exercise mode selected. As an example, in the case of a pre-calculated routine, if during the first cycle of a routine the user's motion is too fast, the adaptive force will be increased, during or on the next cycle, slowing the rate to an optimized value. If on successive cycles the rate is too slow, the force will adapt lower. Additionally, both DMRMs 100 shown are communicating rate and cable length, so both the right- and left-hand forces can be balanced to ensure proper form. When the primary extension or contraction force is experienced, the motor controller reverses current flow and charges self-contained regenerative power supply 107 proportionally to adaptive force 109 experienced by the user. DMRM device 100 can be positioned for many different use cases, therefore, the charge direction for extension or contraction is based upon how DMRM 100 is oriented relative to the user, but will typically be in the higher force bias, to maximize charging of the power source. For example, if the next set point of force is within a range of what a regenerative force can produce, the power supply will be charged. However, if the next set point of force is higher than the regenerative force can supply, the motor will compensate for the gap. The cumulative force is then made up from part regenerative force and part from driving the motor in reverse. The amount of regenerative force accomplished may vary. 20-30% of the force, for example, can be accomplished by regenerative force and the remainder of the force from the motor drive. For example, on a 100 lbs. set point, 20-30 lbs. comes from regenerative force and the remaining 70-80 lbs. from motor drive (draining of power supply). (This is happening in micro/milliseconds of adjustment, so the experienced force is fluid while you are getting 20-30% of recovered charging). FIG. 14 shows an exemplary isometric view illustrating the inner workings of DMRM 140 with self-contained regenerative power supply 147 and demonstrates stator area 141 and typical rotor cover 142 enabled by a slip bearing interface 143. The rotor has torsional freedom of motion in rotational motor direction 144 and extends or retracts a cable or strap attached to re-coil channel 147. When the mode and closed loop motor control commands are sent to motor controller 145, tangential force 146 is generated as resulting force 149 is experienced by the user. Force and position electronics 148 measure and determine the next set of parameters to be used during the next adjustment cycle.

Figure 15:
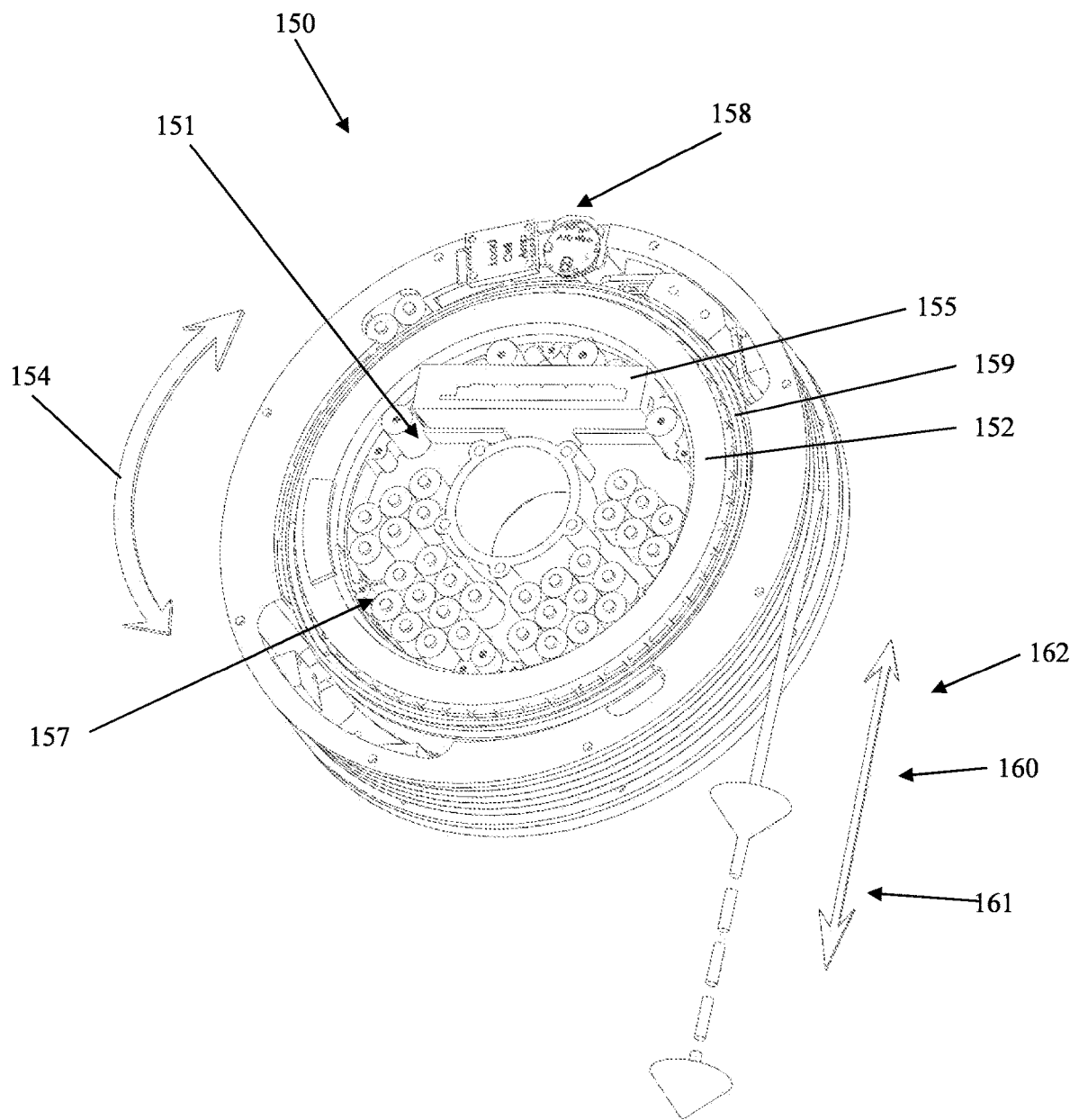
FIG. 15 shows another exemplary embodiment of an isometric view highlighting the inner workings of a DMRM detailing a self-contained regenerative power supply and regenerative capable motor controller packaged within the DMRM.

FIG. 15 shows another exemplary isometric view further highlighting the inner workings of DMRM 150 with self-contained regenerative power supply 157 and regenerative capable motor controller 155 implementation. Although packaged in this embodiment as part of a DMRM, the same principles and utility apply to other force generating devices and electromechanical inner stator and outer rotor motor configurations. The present invention provides a self-contained, regenerative main power source located within the stator section of an electromechanical motor, where the energy expended from physical activity, such as exercise or work, is directed to the power source/supply, recharging the power source. This is accomplished by reversing the typical role of a motor controller. In the regenerative mode, expended energy from the physical activity is equivalent to running the motor in reverse and the controller directing that energy to recharge the self-contained power source. This is accomplished by the ATMU measuring and the ATPU tracking the forces and rotor position from a sensed and tracked home position, gathering and processing power consumption and directional force sensor data of the electromechanical motor, based on the primary contraction or extension force. The ATPU determines the direction of current flow, based upon the programmed routine and a next set point. Commands/proportional values are then sent to the motor controller to apply a regenerative percentage (0-100%). This value is adjusted in real-time based on the forces measured by the ATMU. The ATMU (or functional equivalent) is located on the rotor section of the motor and can pass the measured force either wirelessly or through a slip connector to the ATPU for further processing. The ATPU is a logical component and can be located anywhere, but generally will be located within the stator. The location may be driven by packaging restrictions and the interest in keeping the user display/interface on a non-moving part of the device. If the configuration does not require a local setup or display, a remote device that is wirelessly connected, such as a mobile phone, may house the ATPU (or functional equivalent) located outside of the device with the self-contained regenerative power supply. In the DMRM configuration, the motor controller 155 is also part of the logical ATMU functionality and communicates this information with the ATPU for further processing. The sensors, positional and measurement information are used for the tracking and determination of the current flow direction. In alternate embodiments of this method, the ATMU and ATPU modules can be functionally equivalent; similarly measuring, tracking and processing forces and motor status feedback. Once the extension or contraction forces are determined, the power source is either charging or supplying energy. When charging the power source, the motor controller reverses flow and the current flows back to the self-contained power source proportionately to an adaptive force experienced by the user. In this specific implementation the electromechanical motor is formed by a magnet rotor ring 159 and coil stator 152. A self-contained regenerative power supply 157 is packaged within stator area 151. In this specific configuration contraction force work component 161 drives the motor in reverse or regenerative mode and current flows back to self-contained regenerative power supply 157 resulting in charging the power source (i.e., batteries or fuel cells) as part of the physical exercise. During extension force 162, the motor and current draw from the power source; this is typically a low force movement of the electromechanical motor and would have minimal amperage drain of self-contained regenerative power supply 157. Experienced force 160 is from the user's perspective and is mounted and programmed for an optimal work expenditure. The amperage drain and regenerative charging are correlated to force and position electronics 158 forming a closed loop motor control and regenerative capability. While either extending or contracting, depending on the mounting position, forces act upon a coiled cable or strap attached to the rotational section of the device, the major acting force is converted tangentially and regenerative charging of the power source, for example batteries or fuel cells, occurs back through the same motor. Relative to the device, regenerative force will happen on the extension of the coiled cable or strap. Relative to the use, the regenerative force (or current flow direction) occurs relative to the mounting of the device and the users hand position. For example, where there are two DMRM devices, each with self-contained regenerative power supply, on a barbell having cable ends anchored to the ground, the regenerative force occurs as the cable extends and a user will experience a contraction force (such as during a bicep curl). In another example, the DMRM device with the self-contained regenerative power supply may be mounted overhead and the user's hands are pulling down on a barbell that is tethered to the cable from the DMRM. In this example, the user experiences extension forces and regenerative force also occurs during extension of the cable.

Although some of the exemplary embodiments described herein are tailored for a DMRM, the present invention of a self-contained regenerative power supply system and method is not limited to this configuration and can be used in other apparatus environments using similar applications and methods.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A modular electromechanical motor assembly comprising:
   a stator;
   a rotor;
   a slip bearing interface located in between the stator and the rotor;
   a motor controller,
   a rechargeable main power source located inside the circumference of the stator,
   at least one sensor measuring a directional force generated by the modular electromechanical motor;
   a tracking measurement unit, wherein the tracking measurement unit measures directional forces and the rotor position with reference to a home position of the at least one sensor and transmits the measured force and rotor position data to a tracking processing unit;
   the tracking processing unit processing the measured directional force and rotor position data and power consumption of the electromechanical motor thereby determining a current flow direction, wherein the tracking processing unit sends commands to the motor controller to reverse the current flow direction and send the current flow direction back to the main power source proportionately to an adaptive force experienced by the user, wherein the main power source is charged.

2. The apparatus as recited in claim 1, wherein the main power source is rechargeable batteries or fuel cells.

3. The modular electromechanical motor assembly as recited in claim 1, wherein the main power source is recharged when a net set point of an extension or contraction force is within a range of what the regenerative force produces.

4. The modular electromechanical motor assembly as recited in claim 1, wherein when a net set point of an extension force or a contraction force is higher than a maximum regenerative force supplied, the motor assembly provides a compensative force.

5. The modular electromechanical motor assembly as recited in claim 4, wherein the compensative force is a difference between the higher net set point of the extension force or the contraction force and the maximum regenerative force supplied.

6. The modular electromechanical motor assembly as recited in claim 1, wherein the tracking measurement unit is located in the rotor.

7. The modular electromechanical motor assembly as recited in claim 1, wherein the tracking processing unit is located in the stator.

8. The modular electromechanical motor assembly as recited in claim 1, wherein the tracking processing unit is located on a remote device and wirelessly connected.

9. The modular electromechanical motor assembly as recited in claim 1, wherein the proportional force is adjusted in real time.

10. A method for recharging a main power source located in a stator of a modular electromechanical motor, the method comprising:
   a user creating a primary extension or contraction force;
   measuring power consumption and a directional force of the primary extension or contraction force with at least one sensor and a tracking measurement unit;
   determining a current flow direction by processing the measured power consumption and the directional force with a tracking processing unit; and
   sending commands from the tracking processing unit to a motor controller to reverse the current flow direction, wherein the motor controller sends the current flow back to the main power source proportionately to an adaptive force experienced by the user, thereby charging the main power source.

11. The method as recited in claim 10, wherein a battery charging profile of the power source is calculated and provided as part of a closed loop motor control.

12. A method for recharging a main power source located in a stator of a modular electromechanical motor, the method comprising:
   a user creating a primary extension or contraction force;
   measuring power consumption and a directional force of the primary extension or contraction force with at least one sensor and a rotor position with reference to a home position of the at least one sensor;
   transmitting the measured directional force and the rotor position data to a tracking processing unit;
   determining a current flow direction by processing the measured power consumption, the rotor position data and the directional force with a tracking processing unit; and
   sending commands from the tracking processing unit to a motor controller to reverse the current flow direction, wherein the motor controller sends the current flow back to the main power source proportionately to an adaptive force experienced by the user, thereby charging the main power source.

* * * * *